US009663214B2

United States Patent
Guetta et al.

(10) Patent No.: US 9,663,214 B2
(45) Date of Patent: May 30, 2017

(54) BALLOON-BORNE PLATFORM STABILIZATION

(75) Inventors: Avishay Guetta, Rehovot (IL); Rafael Amber, Ramat Gan (IL); Yuval Guetta, Ashdod (IL)

(73) Assignee: SHILAT IMAGING LTD., Rehovot (IL)

( * ) Notice: Subject to any disclaimer, the term of this patent is extended or adjusted under 35 U.S.C. 154(b) by 597 days.

(21) Appl. No.: 14/004,169

(22) PCT Filed: Mar. 11, 2012

(86) PCT No.: PCT/IL2012/000114
§ 371 (c)(1),
(2), (4) Date: Nov. 10, 2013

(87) PCT Pub. No.: WO2012/120504
PCT Pub. Date: Sep. 13, 2012

(65) Prior Publication Data
US 2014/0054412 A1    Feb. 27, 2014

Related U.S. Application Data

(60) Provisional application No. 61/457,363, filed on Mar. 10, 2011.

(51) Int. Cl.
*B64B 1/50* (2006.01)
*B64B 1/52* (2006.01)

(52) U.S. Cl.
CPC . *B64B 1/50* (2013.01); *B64B 1/52* (2013.01)

(58) Field of Classification Search
CPC .... B64B 1/00; B64B 1/40; B64B 1/50; B64B 1/52; B64B 1/56
See application file for complete search history.

(56) References Cited

U.S. PATENT DOCUMENTS 1,302,007 A * 4/1919 Calthrop ............. B64B 1/40
  244/127
3,270,895 A * 9/1966 Stewart .............. B64B 1/00
  212/71

(Continued)

FOREIGN PATENT DOCUMENTS

WO  2010/032251 A2   3/2010
WO  WO 2011005851 A2 * 1/2011  ............. B64B 1/50

OTHER PUBLICATIONS

PCT International Search Report and Written Opinion of the ISA, mailed Aug. 17, 2012 in PCT/IL12/000114.

(Continued)

*Primary Examiner* — Tien Dinh
*Assistant Examiner* — Michael A Fabula
(74) *Attorney, Agent, or Firm* — Daniel J. Swirsky; AlphaPatent Associates Ltd.

(57) ABSTRACT

An aerial balloon system comprising a payload platform suspended from an inflated balloon by means of a balloon cable, and an anchoring cable attaching the platform to an anchor point beneath it. The balloon cable and anchoring cable are attached to the payload platform by means of a connecting element pivotally attached to the platform. The platform may include a servo controlled pitch stabilizing system using the input from a pitch sensor mounted on the platform to control an angular actuator to change the angle which the platform makes with the pivoted connection element. Additionally, the platform may include a servo controlled orientation stabilizing system using the input from an orientation sensor mounted thereon to control the departure of the orientation of the platform from a predetermined orientation. This may be readily accomplished using a variable pitch rotor, the pitch being controlled by the orientation sensor signal.

13 Claims, 5 Drawing Sheets

(56) References Cited

U.S. PATENT DOCUMENTS

| | | | | |
|---|---|---|---|---|
| 3,359,919 | A * | 12/1967 | Stewart | B64B 1/40 104/22 |
| 3,448,864 | A * | 6/1969 | Fenn | B64B 1/40 104/22 |
| 3,679,155 | A | 7/1972 | Centofanti | |
| 4,020,491 | A | 4/1977 | Bieser et al. | |
| 4,055,316 | A * | 10/1977 | Chipper | B64B 1/50 104/123 |
| 4,486,669 | A * | 12/1984 | Pugh | B64B 1/50 244/154 |
| 4,640,474 | A * | 2/1987 | Manseth | B64B 1/70 244/137.1 |
| 5,757,157 | A * | 5/1998 | Falk | G03B 15/006 244/115 |
| 5,775,640 | A * | 7/1998 | Gobbi | B64B 1/005 244/115 |
| 5,906,335 | A | 5/1999 | Thompson | |
| 6,820,531 | B1 | 11/2004 | Cianciolo | |
| 8,544,788 | B1 * | 10/2013 | Capper | B64B 1/28 244/30 |
| 2006/0214053 | A1 * | 9/2006 | Hase | B64B 1/50 244/33 |
| 2011/0057158 | A1 * | 3/2011 | Von Kessel | B64B 1/50 254/323 |
| 2011/0116905 | A1 * | 5/2011 | Von Kessel | B64B 1/50 414/800 |
| 2011/0222047 | A1 * | 9/2011 | Guetta | B64B 1/50 356/4.01 |
| 2013/0264413 | A1 * | 10/2013 | Aoki | B64B 1/50 244/33 |

OTHER PUBLICATIONS

Supplementary European Search Report of the European Patent Office in corresponding European patent application No. 12755247.9, dated Nov. 12, 2014.

* cited by examiner

BALLOON-BORNE PLATFORM STABILIZATION

CROSS-REFERENCE TO RELATED APPLICATIONS

This application is a U.S. National Phase Application under 35 U.S.C. 371 of International Application No. PCT/IL2012/000114, which has an international filing date of Mar. 11, 2012, and which claims the benefit of priority from U.S. Provisional Patent Application No. 61/457,363, filed on Mar. 10, 2011, which applications are incorporated herein by reference in their entirety.

FIELD OF THE INVENTION

The present invention relates to the field of the spatial stabilization of airborne platforms, especially those which are held airborne by the use of balloon buoyancy.

BACKGROUND OF THE INVENTION

In the International Patent Application for "Aerial Observation System", published as WO/2010/032251, there is described a new lighter-than-air platform, which can carry a payload useful for such tasks as aerial surveillance, target designation, target pointing, laser range finding, wireless relaying, and the like. The system differs in its flight characteristic properties from prior art lighter-than-air systems in that it comprises a novel combination of a separated support balloon and a kite, with the payload on the kite, and the balloon supplying buoyancy to the kite by means of a line attached between the balloon and the kite below it. The use of separate kite and balloon modules provides a level of mechanical isolation of the payload on the kite from the effects of buffeting of the balloon in the wind. This isolation effect can be increased by use of longer connecting cords, or by use of one or more flexible sections in the connecting cord or cords, such as a spring, or an elastomeric section. However even with such means, the payload is still subject to the effect of winds and needs to be stabilized either passively or actively.

Passive stabilization has usually been supplied either:
(i) by use of the well known Picavet suspension system, or an adaption thereof, or any other known passive mechanical stabilization system, or
(ii) by use of a suspension system, as described in the above referenced WO/2010/032251, based on the mounting of the payload on the kite by means of a gimbal system, preferably using two generally orthogonal gimbals, thus allowing freedom of roll and pitch motion of the payload relative to the kite. It is to be understood that the terms roll and pitch are used in their normal nautical or aeronautical sense—roll being rotation about an axis generally in the direction of the length of the motion platform, and pitch being rotation about an axis generally horizontally perpendicular to the direction of the length of the motion platform.

However, such attempts at stabilization using a plurality of connecting cords or supporting gimbals have had only a limited level of success. In particular, support of the payload by a number of cords may even complicate the motion of the platform as the various suspension points complete with each other in providing reaction to the effect of wind buffeting, or in particular, to the actuation of motors on the payload itself. One particular suspension cord or pair of cords may react in one direction to activation of a motor while another one may try to act in the opposite direction, leading to instability of the platform. Therefore, attempts to use passive stabilization with complex compensating harnesses do not generally provide adequate stabilization in wind conditions.

Active stabilization, as described in the prior art, can be achieved by any of the known methods acting directly on the kited platform connected between the buoyancy balloon and the ground anchor line, such as by the use of angular accelerometer stabilization, or by using GPS referencing to stabilize the platform.

However, such active methods may be expensive and complex to implement, and the passive stabilization methods mentioned hereinabove may not provide sufficient stabilization for a payload which requires accurate stabilization during potentially buffeting winds. Furthermore, the payload may be suspended directly from the balloon without the stabilization advantages provided by the kite. In such instances, a more direct form of stabilization is required in order to take the place of the stabilization effect otherwise provided by the kite. There is therefore need for a simpler and more effective system for providing active stabilization to a balloon borne aerial platform.

The disclosures of each of the publications mentioned in this section and in other sections of the specification, are hereby incorporated by reference, each in its entirety.

SUMMARY

The present invention seeks to provide a new balloon-based aerial platform, which includes a number of novel features for providing stabilization of the platform under varying wind conditions. The system comprises a payload platform suspended from a balloon which provides buoyancy, and attached to the ground by means of an anchor line. According to a first exemplary implementation, the cable attaching the payload platform to the ground and the cable attaching the payload platform to the balloon are connected to the top and bottom sides of the payload platform, as single lines attached to single points on the payload. The attachment points are preferably in positions approximately opposite each other such that when the cables are tensioned, the payload adopts it normal operating orientation, which will usually be horizontal if the anchor wire is in a vertical orientation. As the angle of the anchor line changes from its vertical configuration as the wind blows the balloon laterally, the anchor line and the balloon support line also tilt, but maintain the platform in a firm stable position by virtue of the tensional forces arising from the equilibrium of the payload mass and the tensional forces applied at the top and bottom attachment points. The platform essentially becomes an intrinsic part of the cable between the anchor and the balloon, and since the anchor cable is the most stable part of the suspension system, while the balloon, being most exposed to wind buffet, is the most unstable part of the suspension system, the close integration of the platform as a part of the anchor cable may be of assistance in stabilizing the platform. Furthermore, when the payload is attached to the balloon by a single line, lateral motion of the balloon as a result of wind buffet causes the angle of attachment of the cord to the platform to change, which results in less perturbation to the platform than the situation of multiple cord attachment to the balloon, which may have the effect of changing the attitude angle of the platform with every change in balloon position. As a result, the effect of wind buffeting on the payload is decreased, because of the tensional forces applied to the platform from opposite sides. This is in contrast to the prior art multiple point suspension schemes, which generally result in considerable vibrational motion during wind buffeting.

The connection points to the payload can either be at upper and lower attachment points on the payload platform itself, or can be at either end of a solid strut extending upwards and downwards from the payload, so as to provide a rigid connection section within the anchor line itself, that rigid connection section also being an integral part of the platform. By this means, the connection points are distanced somewhat from the platform, increasing the orientational stability provided by this method. In general, since reliance is made on the anchor line as the more prominently stabilized element of the support system, in contrast to the balloon line which is the less stabilized element of the support system, additional stability may be provided by distancing the payload platform from the balloon, such that it is further from the source of the wind perturbations. Thus the payload platform may advantageously be connected at a substantial distance from the balloon, typically 5 to 10% of the total intended length of the support line, or even more.

There are two disadvantages of this mode of suspension using single point attachment to the anchor line and to the balloon line.

In the first place, the effect of wind is to tilt the platform from its horizontal position. Therefore some form of horizontal stabilization is required in order to use the platform as a basis for any activities requiring a horizontal field of view. Exemplary implementations of such stabilization mechanisms are now shown, using a connecting strut pivotally attached to the platform and additionally and optionally, servo-controlled angular actuator, receiving its input from a pitch sensor, to control the angle the payload platform makes with the connection element. Such an exemplary implementation is an extension of the connecting strut system, and incorporates an active stabilization system for ensuring that the platform maintains a level orientation, regardless of the extent that the wind causes the anchor cable to tilt, so that when a surveillance device such as an onboard camera is rotated, the field of view remains level, and the scan can cover the whole of the field of view horizontally. According to such implementations, the cable attaching the payload platform to the ground and the cable attaching the payload platform to the balloon are connected at opposite ends of the connecting strut, to which the payload platform is attached by means of a pivot, such that the strut can rotate relative to the platform, and vice versa. As the wind blows the balloon laterally, and the angle of the anchor line changes from a vertical configuration to an orientation at an angle to the vertical, the anchor line, the strut and the balloon support line in tension generally tilt to that angle. However, since the platform can rotate about its pivot relative to the strut, if a suitable stabilization system is used, the platform can be made to maintain a predetermined orientation, such as a horizontal orientation, independent of the angle of the anchor and balloon lines. The stabilization should be active, and can be driven by a gyroscope.

Secondly, the single-line support system provides no resistance to rotation of the platform around the line, unlike prior art methods which use several cords and thus provide resistance to rotation around the support line. Therefore some form of stabilization against rotation is required in order to use a platform with acceptable pointing stability. One exemplary implementation of such a stabilization mechanism is described hereinbelow, using a servo-controlled orientation actuator, receiving its input from an orientation sensor, to control the orientation of the payload platform. A particularly convenient and efficient orientation actuator can be in the form of a variable pitch rotor mounted remotely from the axis of rotation of the platform, and with its rotation axis horizontally, such that the air blown by the rotor exerts a lateral thrust which can rotate the platform about its axis of rotation. Control of the level and direction of this thrust is executed by varying the pitch of the rotor blades. A sensor determines the angular orientation or angular velocity of the platform in the horizontal plane, and provides a feedback signal to a control system which changes the attack angle of the pitch blades should the orientation of the platform change from that of a predetermined orientation. By this means, the yaw of the platform can be stabilized and controlled.

Another exemplary implementation uses extendable elastic cords to attach the payload platform to a point at the upper end of the payload, the cords being generally attached to longitudinal and lateral extremities of the platform, and providing a level of shock absorbance to isolate the platform from the effects of wind buffeting shocks. While the first implementation is effective in reducing wind buffeting motion having a frequency of the order of 1 Hz or less, this implementation enables higher frequency vibrations of up to 10 Hz to be dampened, depending on the elastic characteristics of the suspension of the shock absorber.

A novel parachute system is also described, in which the parachute canopy is draped over the balloon, and the junction of the parachute lines is connected to the support junction connecting the payload platform to the balloon, by means of a slightly slack cord, such that should the balloon undergo sudden deflation, the payload platform tensions the slightly slack cord and hangs therefrom, and descends to ground level using the already deployed parachute canopy.

There is thus provided, a first exemplary implementation of an aerial balloon system comprising:
(i) a payload platform,
(ii) a lighter-than-air inflated balloon supporting the payload platform from above by means of a balloon cable, and
(iii) an anchoring cable attaching the payload platform to an anchor point beneath the payload platform,
wherein the balloon cable and the anchoring cable are attached to the payload platform by means of a connecting element pivotally attached to the payload platform.

Such a system may further comprise a pitch stabilizing system, such that the payload platform has its pitch stabilized even when the angular orientation of at least one of the anchoring and the balloon cables undergoes a change. The pitch stabilizing system may simply comprise a passive weight suspended beneath the payload platform.

Another implementation may further involve a pitch stabilizing system comprising:
(i) an angular actuator adapted to control the angle the payload platform makes with the pivoted connection element,
(ii) a pitch sensor mounted on the payload platform outputting a pitch signal defining the departure of the pitch of the payload platform from a predetermined pitch, and
(iii) a servo system receiving the pitch signal and adapted to output a signal to drive the angular actuator to maintain the payload platform in the predetermined pitch. Any of these pitch stabilizing systems may be adapted to maintain the payload platform at an essentially horizontal pitch.

Furthermore, any of the above described systems may further comprise an orientation stabilizing system, such that the payload platform has its orientation stabilized even when the payload platform is subject to external forces tending to change its orientation. Such an orientation stabilizing system may comprise:

(i) an orientation actuator adapted to control the orientation of the payload platform,
(ii) an orientation sensor mounted on the payload platform outputting an orientation signal defining the departure of the orientation of the payload platform from a predetermined orientation, and
(iii) a servo system receiving the orientation signal and adapted to output a signal to drive the orientation actuator to maintain the payload platform in the predetermined orientation. In such an orientation stabilizing system, the orientation actuator may comprise a variable pitch rotor rotating in a generally vertical plane, attached in the region of one extremity of the payload platform, and the pitch of the rotor blades may bee controlled according to the orientation signal.

Alternatively, the orientation actuator may comprise a pair of rotors attached in generally vertical planes in the region of one extremity of the payload platform, directed in opposite azimuthal directions, and adapted to rotate in opposite directions, wherein the operation and speed of either of the rotors is controlled according to the orientation signal.

According to yet another implementation, the orientation actuator may comprise a rotor pivotally adapted to enable it to turn in a generally vertical plane, attached in the region of one extremity of the payload platform on a pivot axis, so that the direction of its air flow can be varied, wherein the direction in which the air flow of the rotor is directed may be controlled according to the orientation signal.

In any of the previously described aerial balloon systems, the balloon cable may comprise a ring disposed between the payload platform and the balloon, and the payload platform may be connected to the ring by means of elastically extendable cords threaded therethrough, at least one of the cords being attached to points longitudinally separated on the payload platform, and at least another of the cords being attached at points laterally separated on the payload platform. Alternatively, the system may further comprise elastically extendable cords, at least one pair of the cords being attached between an attachment point located near an extremity of the connecting element and points longitudinally separated on the payload platform, and at least another pair of the cords being attached between an attachment point near an extremity of the connecting element and points laterally separated on the payload platform, each of the cords having a damping element connected in parallel to it.

Generally, in any of the above described systems, the balloon cable and the anchoring cable may be connected to opposite extremities of the connecting element, or they may be a single cable clamped to the connecting element.

In any of the previously described aerial balloon systems, the connecting element may, instead of a strut, alternatively be a frame having two side elements between which the payload platform is pivotally hung. In such a case, the system may further comprise a pair of upper attachment cables each attached to one of the side elements of the frame, and wherein the upper attachment cables are joined to each other and to the balloon cable at a single junction. Additionally, the side elements of the frame may be attached to the anchoring cable by a loop attachment cable running round a pulley, and the anchoring cable may then be connected to the axis of the pulley.

Alternative implementations perform a method of supporting a payload platform from an aerial balloon, comprising:
(i) providing the payload platform and a lighter-than-air inflated balloon,
(ii) supporting the payload platform from the balloon by means of a balloon cable, and
(iii) attaching the payload platform to an anchor point beneath the payload platform by menas of an anchoring cable,
wherein the balloon cable and the anchoring cable may be attached to the payload platform by means of a connecting element pivotally attached to the payload platform.

Such a method may further comprise the step of fitting a pitch stabilizing system on the payload platform, such that the payload platform has its pitch stabilized even when the angular orientation of at least one of the anchoring and the balloon cables undergoes a change.

In such an implementation, the pitch stabilizing system may comprise:
(i) an angular actuator controlling the angle the payload platform makes with the pivoted connection element,
(ii) a pitch sensor mounted on the payload platform outputting a pitch signal defining the departure of the pitch of the payload platform from a predetermined pitch, and
(iii) a servo system receiving the pitch signal and outputting a signal to drive the angular actuator to maintain the payload platform in the predetermined pitch. The pitch stabilizing system may maintain the payload platform at an essentially horizontal pitch.

Any of these methods may further comprise the step of fitting an orientation stabilizing system on the payload platform, such that the orientation of the payload is stabilized even when the payload platform is subject to external forces tending to change its orientation. Such an orientation stabilizing system may comprise:
(i) an orientation actuator adapted to control the orientation of the payload platform,
(ii) an orientation sensor mounted on the payload platform outputting an orientation signal defining the departure of the orientation of the payload platform from a predetermined orientation, and
(iii) a servo system receiving the orientation signal and adapted to output a signal to drive the orientation actuator to maintain the payload platform in the predetermined orientation. In such a configuration, the orientation actuator may comprise a variable pitch rotor rotating in a generally vertical plane, attached in the region of one extremity of the payload platform, and the pitch of the rotor blades may be controlled according to the orientation signal.

Finally, in any of these methods, the connecting element may be a frame having two side elements, and the payload platform may then be pivotally hung between the side elements.

Further example implementations involve an aerial balloon system comprising:
(i) a payload platform,
(ii) a lighter-than-air inflated balloon supporting the payload platform from above by means of a balloon cable, and
(iii) an anchoring cable attaching the payload platform to an anchor point beneath the payload platform,
wherein the balloon cable and the anchoring cable are attached to top and bottom regions of the payload platform in positions approximately opposite each other such that the tensional forces running through the platform between the two connection points reduce the response of the payload platform to wind buffeting when compared to a platform supported at multiple connection points. In such a system, the top and bottom regions of the payload platform may be disposed on the opposite ends of protrusions rigidly attached to the payload platform, such that the attachment points are distanced from the payload platform.

An additional implementation can include an aerial balloon system comprising:
(i) a balloon with a number of support cords extending from its body to a first junction, to which a payload is attached,
(ii) a parachute canopy draped over the balloon, the parachute canopy having a plurality of cords extending from its lower edge and tied together at a second junction beneath the balloon but above the first junction, and
(iii) an additional cord connected between the first and the second junctions, the additional cord being of such a length that it is not under tension when the balloon is inflated, wherein the payload becomes suspended from the parachute canopy by the additional cord and the plurality of cords if the balloon undergoes deflation.

Such a system therefore also provides a method of safeguarding a payload suspended from a lighter than air balloon, in the event that the balloon undergoes deflation, comprising:
(i) providing the balloon with a number of support cords extending from its body to a first junction, to which the payload is attached,
(ii) draping a parachute canopy over the balloon, the parachute canopy having a plurality of cords extending from its lower edge and tied together at a second junction beneath the balloon but above the first junction, and
(iii) connecting an additional cord between the first and the second junctions, the additional cord being of such a length that it is not under tension when the balloon is inflated, such that the payload becomes suspended from the parachute canopy by the additional cord and the plurality of cords in the event that the balloon undergoes deflation.

It is to be understood that when reference is made to the ground anchoring point, this point may be literally on the ground, on a building, on ship or on a vehicle, the term is thus to be understood throughout this application and may be thuswise also claimed.

BRIEF DESCRIPTION OF THE DRAWINGS

The present invention will be understood and appreciated more fully from the following detailed description, taken in conjunction with the drawings in which.

DETAILED DESCRIPTION

Figure 1A:
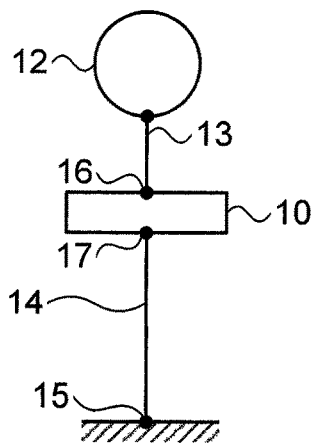
FIGS. 1A, 1B and 1C illustrate schematically balloon-borne payload platforms tethered according to a first novel method described in this disclosure.
Figure 1B:
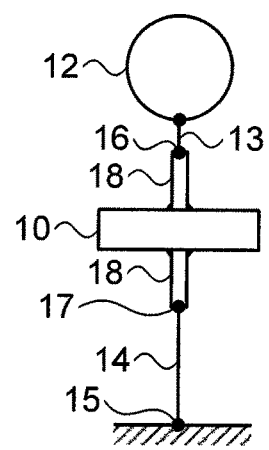
Figure 1C:
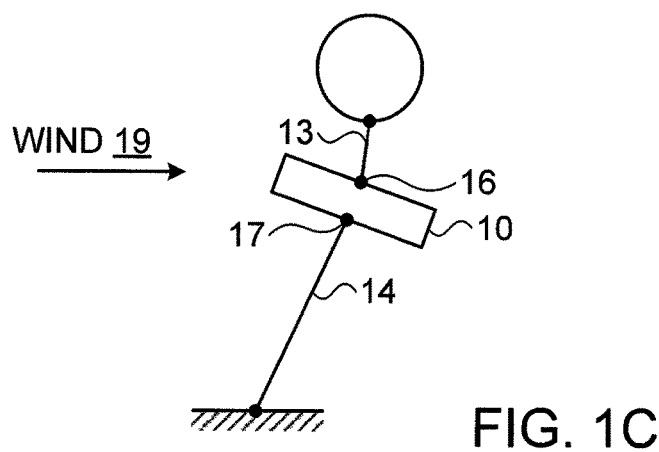

Reference is now made to FIGS. 1A to 1C, which illustrate schematically a balloon borne payload platform 10 connected according to the novel methods described in this disclosure. The payload platform is attached to the balloon 12 by means of a cord 13 attached to a connection point 16 located at the top end of the platform, while the anchor wire 14 is attached to a connection point 17 located at the lower end of the platform. The two connection points are preferably disposed opposite each other, such that when the platform is horizontal, a line drawn between the connection points is vertical. In FIG. 1A, the balloon is shown in a situation where there is no wind, and the cable rises vertically from the anchor point on the ground or on a ship or other vehicle, via the payload platform to the balloon.

FIG. 1B shows an alternative method of providing the attachment points to the payload platform 10, at either end of a solid strut 18 extending upwards and downwards from the payload, so as to provide a rigid connection section within the anchor line 13, 14 itself. That rigid connection section thus effectively becomes an integral part of the platform. By this means, the connection points 16, 17 are distanced from the platform, increasing the orientational stability provided by this method. In general, since reliance is made on the anchor line as the more prominently stabilized element of the support system, in contrast to the balloon line which is the less stabilized element of the support system, additional stability may be provided by distancing the payload platform from the balloon, such that it is further from the source of the wind perturbations. Thus the payload platform may advantageously be connected at a distance from the balloon.

FIG. 1C shows a situation for the exemplary case of FIG. 1A, in which there is a wind 19 which has caused the balloon to drift to the right of the drawing. In order to maintain the tension of the balloon attachment cable 13 and the ground anchoring cable 14, the platform 10 rotates by an angle of tilt similar to that of the anchor cable. Because of the effect of the weight of the platform, the attachment points 16 and 17 will be not generally be aligned co-linearly with the anchor cable 14 and balloon cable 13, though since the lack of co-linearity depends on the weight of the platform, and may be small, it may not be evident in all of the drawings. The platform essentially becomes an integral part of the cable between the anchor and the balloon. According to this arrangement, although every change in wind direction causes the payload platform to tilt accordingly, the tensional forces running through the platform between the two connection points reduce the response of the platform to every wind buffet, and a damping effect to wind buffeting motion is achieved.

FIGS. 1A to 1C illustrate how this method of connection controls low-frequency variations in the pitch of the payload platform, but it is to be understood that vibrations in the roll direction of the payload platform can also be controlled by such a connection method, if the wind is such as to attempt to blow the balloon in a direction perpendicular to the plane of the drawing.

Figure 2A:
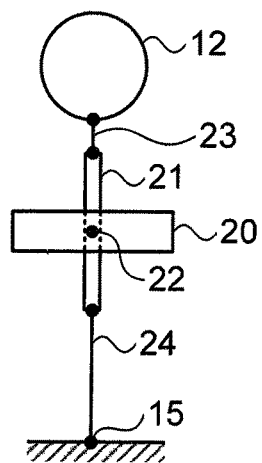
FIGS. 2A and 2B illustrate schematically the balloon borne payload platform of FIGS. 1A and 1B but connected to the ground anchor point and to the balloon by means of a novel pivoted connecting strut system.
Figure 2B:
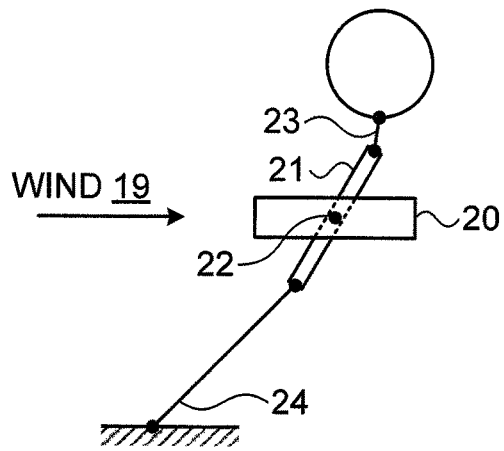

Reference is now made to FIGS. 2A and 2B, which illustrate schematically the balloon borne payload platform of FIGS. 1A to 1C but connected to the anchor point and to the balloon by means of an exemplary pivoted strut connecting system. This connecting system can be used in order to implement a novel, level-stabilization system. The connecting strut 21 is attached to the payload 20 by means of a rotating pivot 22 which allows the strut to change its attitude angle relative to the payload axis. The payload platform 20 is attached to the balloon 12 by means of a cord 23 attached to the top end of the connecting strut 21, while the anchor wire 24 is attached to the bottom end of the connecting strut 21. By this means, the cable 23, 24 running from the balloon down to the ground based anchoring point 15 passes through the payload platform, but does not affect the pitch of the payload since it is pivotally connected to the payload platform by means of the connecting strut 21. In FIG. 2A, the balloon is shown in a situation where there is no wind, and the cable rises vertically from the anchor point through the payload connecting strut to the balloon. FIG. 2B on the other hand, shows a situation in which there is a wind which has caused the balloon to drift to the right of the drawing, and the anchor cable 24 to make an angle with the normal to the ground. The connecting strut 21 also rotates about its pivot relative to the payload platform 20, to try to maintain close to colinearity of the balloon attachment cable 23 and the ground anchoring cable 24. Because of the way in which the connecting strut 21 is pivoted to the payload platform 20, the payload platform is free to maintain an orientation independent of the angle of the connecting strut. Therefore, if any orientation stabilizing mechanism is applied to the platform, even a passive mechanism such as a weight suspended beneath the platform, it can maintain a constant pitch, or at least a less perturbed pitch, even though the angle of the anchoring cable changes significantly as the wind changes.

The need for the platform to maintain a specific pitch orientation is particularly important when a camera or similar surveillance device is on board, and is required to survey a horizontal field of view in all directions, without the field of view being tilted by dipping into the ground surface or arcing up into the sky at different angles. In order to achieve this, it is necessary to stabilize the payload platform horizontally, even if the wind tilts the angle of the anchoring cable away from the vertical orientation.

Figure 2C:
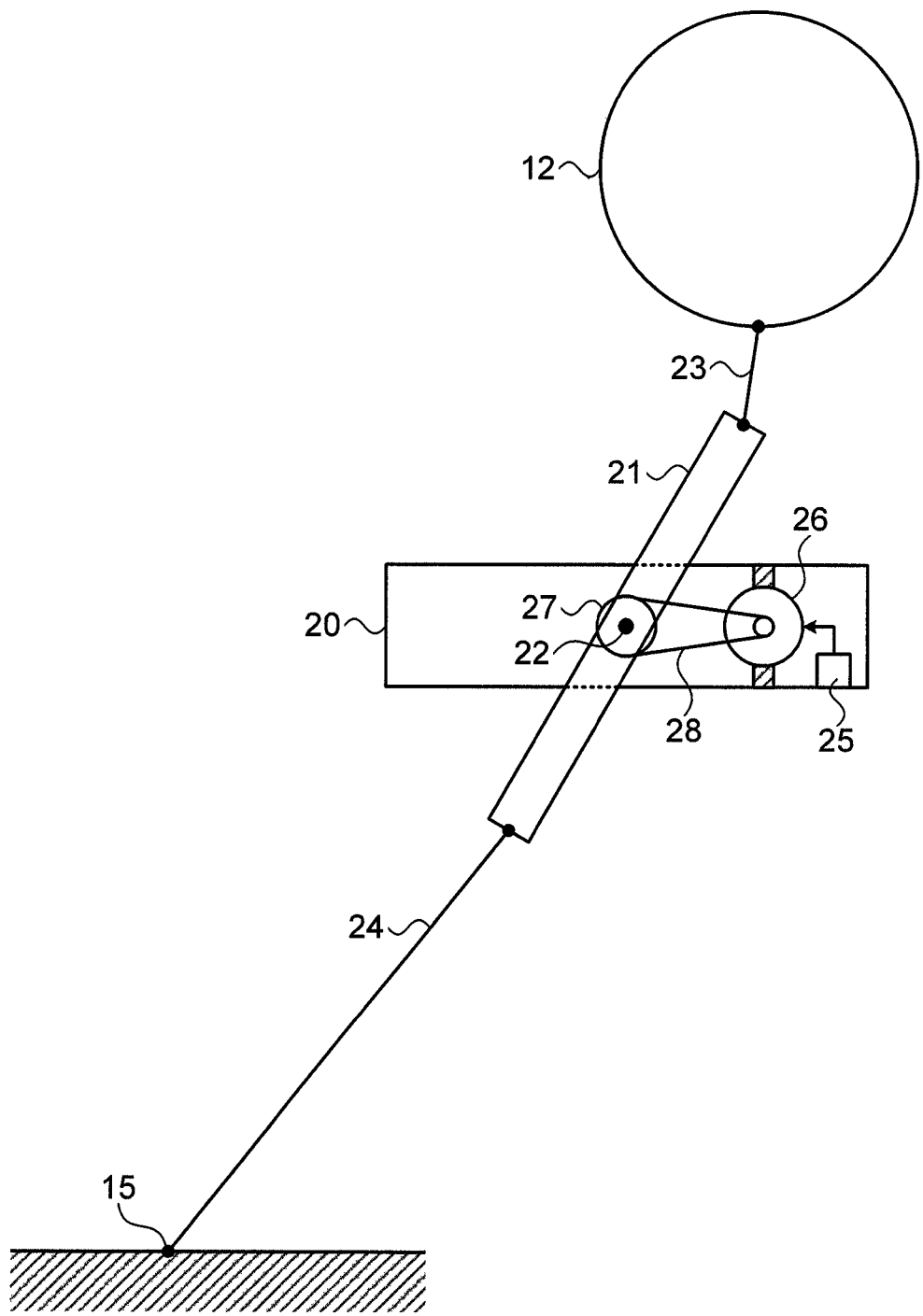
FIG. 2C illustrates schematically the use of the arrangement shown in FIGS. 2A and 2B for actively stabilizing the payload platform, using a servo system to maintain horizontal orientation of the platform independently of the angle which the anchor cable adopts as a result of the wind.

Reference is now made to FIG. 2C, which illustrates schematically an example of a servo system which operates in conjunction with the connecting strut structure shown in FIGS. 2A and 2B, to maintain active horizontal orientation of the platform independently of the angle which the anchor cable adopts as a result of the wind. In the cut-away view of FIG. 2C there is shown an orientation sensor 25, which could be gyroscopically based, or compass based. The sensor detects the pitch of the platform 20, and if any deviation is detected from the predetermined desired pitch, a control signal is sent to a servo motor 26, which is connected to a pulley 27 on the connection strut 21, and corrects the orientation of the platform relative to the strut in order to maintain the predetermined desired pitch. The connection between the servo motor and the strut angular rotation device is shown in FIG. 2C using a pulley 27 driven by a flexible belt drive 28, though it is to be understood that a gear wheel connection could equally well be used, or the servo motor could even be mounted on the pivot axis itself 22, and rotate the strut directly.

The longer the connecting strut 21, the further apart are the two connecting points to the cable, and the more effective is the stabilization effect provided by this structure. As an alternative structure, the connecting strut can be provided with a hollow bore, with the anchor cable running through the hollow bore, such that the balloon could be attached to the anchor cable itself. However, in this implementation, although the same cable runs through from the anchoring point to the balloon, it is clamped within the hollow bore, and therefore the entry and exit points from that hollow bore behave as though they were the attachment points to the strut of separate cables, as in FIGS. 2A to 2C.

FIGS. 2A to 2C illustrate how the pitch of the payload platform is stabilized, but it is to be understood that roll of the payload platform can also stabilized when the wind is such as to attempt to blow the balloon in a direction perpendicular to the plane of the drawing, by use of a servo stabilizing system operating in the direction perpendicular to that of FIG. 2C, such that roll of the platform can also be stabilized.

Figure 3:
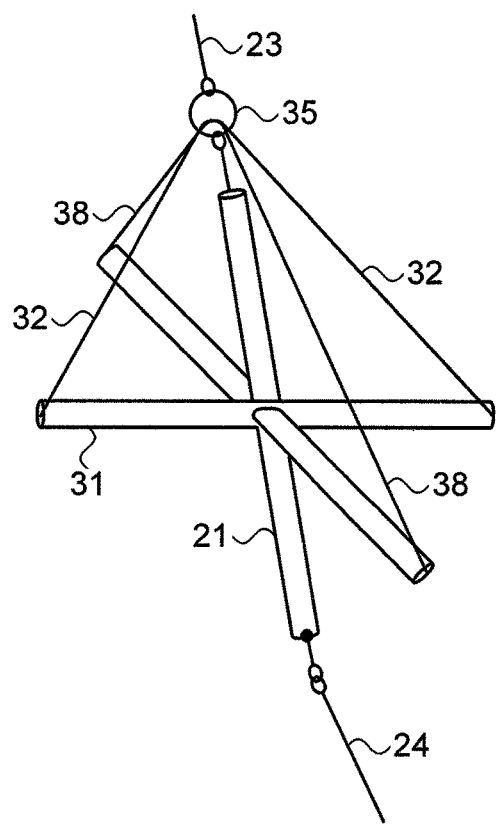
FIG. 3 illustrates schematically a wind buffet shock absorbing structure applied to the payload platform described in FIGS. 2A and 2B.

Reference is now made to FIG. 3, which illustrates schematically a shock absorbing structure to reduce higher frequency vibrations due to buffeting of the wind, as applied to the payload platform supported as described in FIGS. 2A and 2B. Since the wind direction and speed can change suddenly and rapidly, such changes induce vibrations into the payload platform. According to the implementation shown in FIG. 3, the payload platform is connected to the balloon cable 23 by means of a ring 35. Two extendible or elastic cords or spring cables (hereinafter generically termed elastic cords) are threaded through this ring, and are attached to the ends of generally perpendicular booms on the payload platform. One boom 31 runs along the fore and aft direction of the platform, and a first elastic cord 32 is attached to points at or near opposite ends of the boom 31. If the payload platform undergoes a sudden pitching motion, such that, for instance, the right-hand end of the platform shown in FIG. 3 moves downwards, the right-hand section of the elastic cord 32 will be stretched and will operate like a spring to bring the right-hand end of the boom back towards its level equilibrium position. Conversely if the pitch motion causes the left-hand end of the boom to move in a downwards direction, the left-hand section of the elastic cord 32 will be stretched and will thus operate to return the boom to its level equilibrium position. In order to prevent the spring oscillations from continuing, the friction of the sliding of the elastic cord 32 through the ring 35 is operative to dampen the oscillations from continuing. The coefficient of friction between the elastic cord outer surface and the inside of the ring has to be adjusted, such as by selection or treatment of one or both sliding surfaces, in order to provide the correct level of friction damping. Thus the combination of the fore and aft elastic cord 32 and the friction of the cord in the ring 35 is operative to act as a spring and shock absorber combination, and to rapidly dampen any pitch vibrations. In a similar manner the lateral boom 36, and the elastic cord 38, are operative to dampen any roll vibrations acting on the payload platform. This combination provides damping for vibrations generated by the wind of up to the order of 10 Hz. Since the elastic cords and the ring only operate as a spring-shock absorber combination, and do not play any part in supporting the system, there is no need for the ring to be above the platform, and this implementation would work equally well with the ring below the platform. Furthermore, since shock absorbers are combinations of two elements, a spring element and a friction element, it is to be understood that the combination shown in FIG. 3 is not the only manner in which to achieve the object of damping higher frequency vibrations, but that any other combination may also be used. For instance, instead of using the friction of the cords sliding through the ring to provide the damping, the elastic cords could be firmly fixed to the attachment point, and separate hydraulic or other dampers could be used in parallel with the elastic cord to provide the damping. Finally, although a circular ring is shown in the implementation of FIG. 3, it is to be understood that any fixture which allows motion of the elastic cords through it can be equally well used.

The implementation shown in FIG. 2C provides active stabilization to the payload platform to overcome changes in pitch and roll. In order to stabilize the platform from orientation changes, or yaw motion, i.e. rotation around the vertical axis of the payload platform or the anchor cord, a novel active stabilization system is proposed in the form of an air blowing system, installed offset from the center of horizontal rotation of the payload platform, so that it can provide rotational thrust to the payload platform to counteract any transient yaw motion resulting from abrupt or gradual changes in the wind direction. The air blowing system may conveniently be installed on a boom projecting from one side of the payload platform or on one end of the fore-aft length of the platform.

Figure 4:
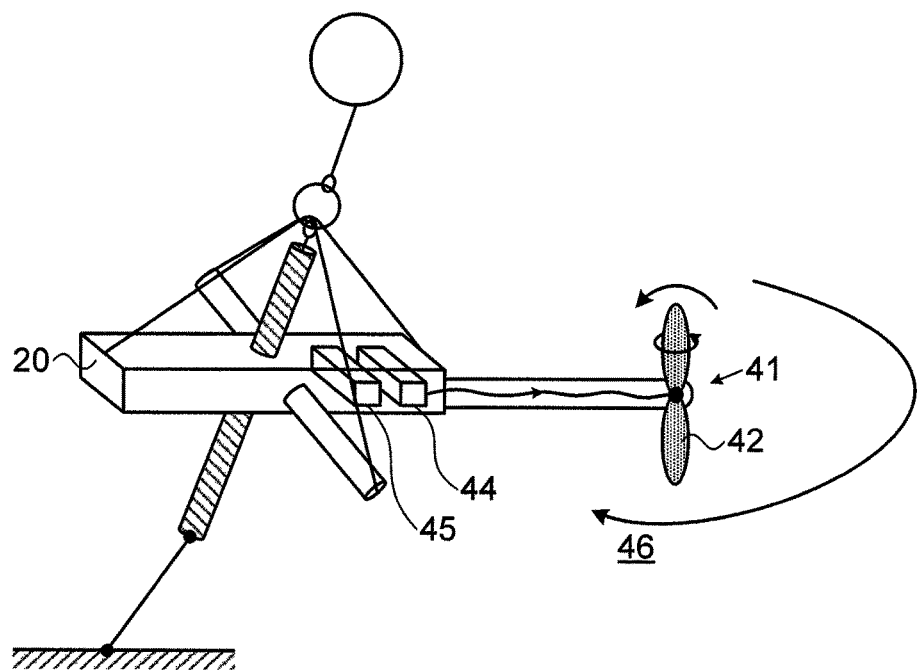
FIG. 4 illustrates schematically an active system for stabilizing the platform from yaw motion, in the form of a variable pitch vertical rotor mounted at either end of a boom of the platform.

Reference is now made to FIG. 4, which illustrates one exemplary implementation of such a rotation stabilization system. A variable pitch vertical rotor 41 is mounted at one end of the fore and aft length of the platform. This vertical rotor 41 resembles the anti-torque rotor of a helicopter. However unlike the anti-torque rotor of a helicopter, whose function is simply to overcome the counter rotation effect generated by the main lift rotor, in this implementation the vertical rotor is used to stabilize the orientation of the payload platform 20 around the vertical axis. The vertical rotor 41 is equipped with variable pitch blades 42, the variability of the pitch being shown by the small arrow wrapped around the top blade, and whose angle of attack is controlled by means of an onboard controller 44. The input signal to the controller may be generated by means of an orientation sensor 45, such as a gyroscope based sensor or a compass based sensor, which detects any change from the predetermined platform direction, and the orientation sensor 45 provides a feedback signal via the controller 44 to the variable pitch rotor 41. This rotor then adjusts the pitch of its blades 42, to provide lateral thrust which rotates the payload platform, as indicated schematically by the arrow 46, back towards its predetermined orientation to eliminate the orientation offset signal of the controller. In general, the orientation of the platform is defined by the wind direction, and the servo system corrects any deviation therefrom according to the angular velocity of the platform around its anchor line axis. The payload, without yaw control, will generally point downwind. Every sudden yaw movement (angular motion) of the payload, caused by acceleration or wind gusts, will cause the rotor to apply force in the opposite direction and resist the payload movements. The gyroscope measures change in angular velocity and the system reacts by applying rotor force, so that the payload returns to pointing downwind. The pitch of the rotor should be capable of being varied over a range which enables the rotor to provide an air stream in either direction relative to the plane of the rotor, so that yaw correction can be provided in either direction of rotation of the platform. Finally, the most convenient method of controlling the side thrust is indeed by keeping the rotor speed constant and by varying the blade pitch, since this may utilize a simple control and power management system. By means of the above described implementations, the platform is also actively stabilized against undesired yaw motions or vibrations.

As an alternative to a variable pitch rotor construction, any other mechanism which can exert real time control on the orientation of the payload platform may also be used. For example, a vertically disposed rotor like that of FIG. 4 may be used, but instead of being fixed to the boom and using variable pitch to vary the sideways thrust exerted on the boom of the payload platform, the rotor can be mounted such that its direction of blowing is rotatable about an essentially vertical axis, thus enabling it to exert a sideways thrust on the tail boom according to the direction in which it is pointed, as determined by the orientation servo system. Alternatively, two such rotors could be provided, each operating in an opposite direction, such that the overall rotational correction thrust is obtained by operating one or the other of the two rotors, or both of them in a differential mode, and by the blowing level at which the operating rotor or rotors are working. Also, instead of use of mechanical rotors, it is possible to provide the sideward rotational thrust by use of jets of gas issued from nozzles directed in the relevant direction to provide the correction rotational thrust. The levels of the gas jet or jets issued, and their direction, can be used in order to control the yaw correction thrust applied.

Figure 5B:
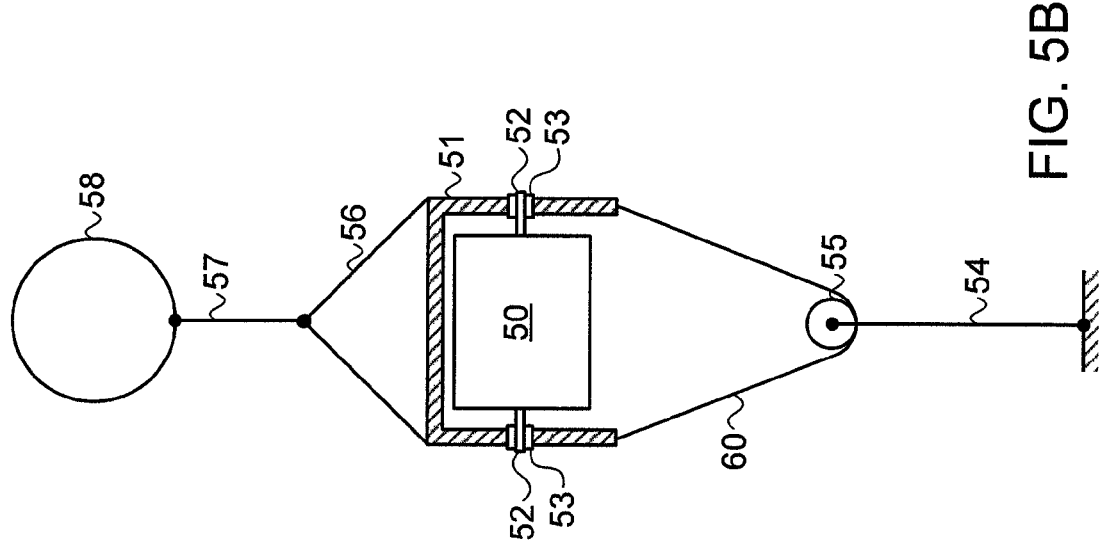
FIGS. 5A and 5B illustrate a further implementation of systems for actively stabilizing balloon-borne payload platforms, incorporating aspects of the previous implementations and methods of integrating them together.
Figure 5A:
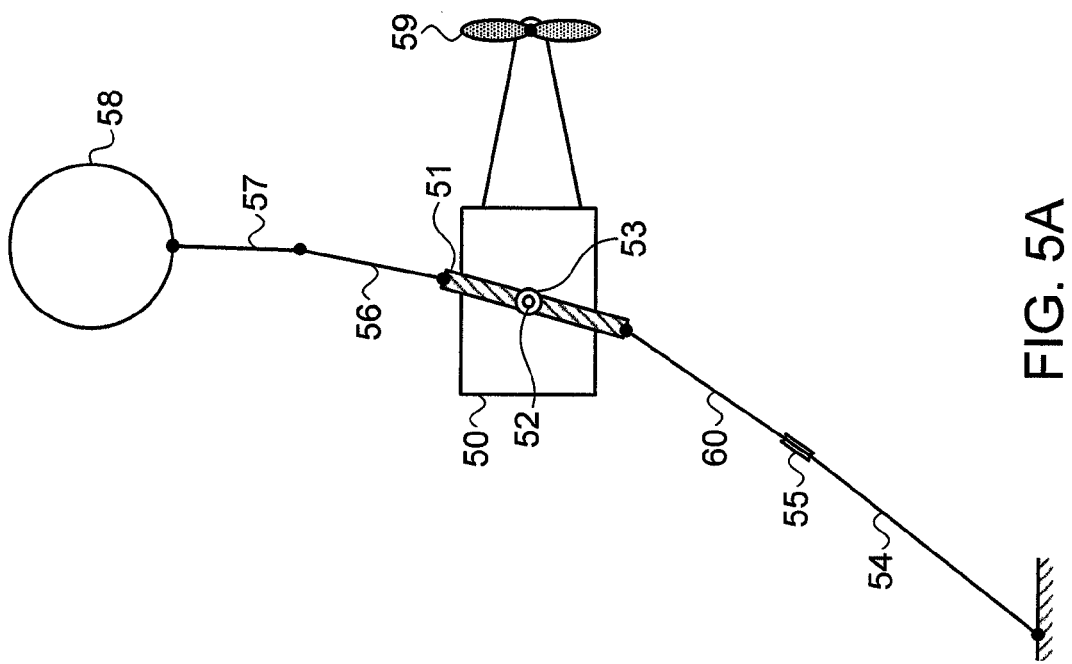

Reference is now made to FIGS. 5A and 5B, which illustrate schematically an alternative structure for the pivoted strut obstruction shown in FIGS. 2A to 2C, which may be more practical in use. FIGS. 5A and 5B show the alternative structure from two orthogonal projections. In FIGS. 2A to 2C, the pivoted strut was shown schematically as though it passes through the payload itself, simply for the purpose of explaining the operation of this aspect of the invention. However it would be more practical to have a pivoted strut that supports the payload, without imposing any external constraints on the payload itself. In FIG. 5B, there is shown such a pivoted strut in the form of a frame 51, which extends on both sides of the payload 50, and which supports the payload by means of bearings 53 in which short pivot axes 52 attached to the payload sit. The payload can thus be optimally manufactured without any constraints or consideration of its ultimate use in the balloon system of the present disclosure, in which it is implemented simply by the addition of the external pivot axes 52. This bearing pivot construction allows the strut frame 51 to vary its angle relative to the payload 50, as shown in FIG. 5A, which is an analogous to the operation of the pivoted strut of FIGS. 2A to 2C. The frame itself can be manufactured of any suitable lightweight material, with a composition carbon fiber construction being of particular usefulness in reducing weight. The payload can be fitted with a pitch stabilization system, such as that described in the implementation shown in FIG. 2C, and additionally with a yaw stabilization system, such as the variable pitch rotor system shown in FIG. 4. Such a rotor 59 is shown in FIG. 5A on the end of a boom projecting from the payload 50.

The frameless strut 51 may be hung from the balloon 58 most conveniently and most stably by means of a pair of cables 56 attached to the sides of the frame 51, and joined to a single cable 57 from their junction to the balloon 58. The frame can be connected to the anchor point in a similar manner, by means of a pair of cables 60, each one attached to one side element of the frame, and from a junction of this pair of cables 60 to the anchor point by means of a single cable 54.

However, if the pair of support cables 60 were attached at a fixed junction to the anchor cable 54, there would arise a problem with the yaw stabilization system when the wind blows the system such that an angle exists between the combination of the anchor cable 54 and the support cables 60, and the frame strut 51 itself, as shown in FIG. 5A. Because of the pair of cables 56 supporting the frame 51 from above, the frame rotates about the line dividing the angle between the two cables 56 of the pair. So long as there is no wind and all of the cables have a vertical orientation, which is the situation shown in FIG. 5B, there is no impediment to rotation of the frame and payload around this vertical axis. However, when a real life situation, such as that shown in FIG. 5A exists, the wind shift causes the various cables to be mutually angled, as shown in FIG. 5A. In such a situation, if an attempt is made to rotate the payload about its axis of rotation at the intersection angle between the upper pair of support cables 56, as would indeed occur during yaw correction, a severe restraint would be put on the yaw correcting system, since one of the support cables 60 would have to shorten and the other one would have to lengthen in order to provide free rotation. This would cause undue load on the rotor correcting system, since any attempted change in the length of the support cables 60 would cause the entire system to skew, and the correction would therefore not be operable. In order to overcome this problem, the support cables 60 are connected to each other by means of a pulley 55, such that as one of the support cables 60 shortens, the other one can lengthen freely by the same amount, thus enabling the payload to rotate freely and without loading the yaw stabilization system. In effect, the support "cables" 60 are effectively a single loop of cable passing round the pulley. The axis of the pulley can then be connected to the anchor cable 54. With regard to the upper pair of support cables 56, because the frame rotates about the line dividing the angle between the two cables 56 of the pair, the frame behaves as if it is supported equally by the two cables 56, and because of this symmetry, there is no similar effect at the top joint tending to impede rotation, and the upper joint can therefore be fixed with both cables 56 of the same length.

This implementation thus enables the payload 50 to be conveniently carried and to be conveniently stabilized in all directions, such as by the various mechanisms shown in the previously described drawings.

Figure 6:
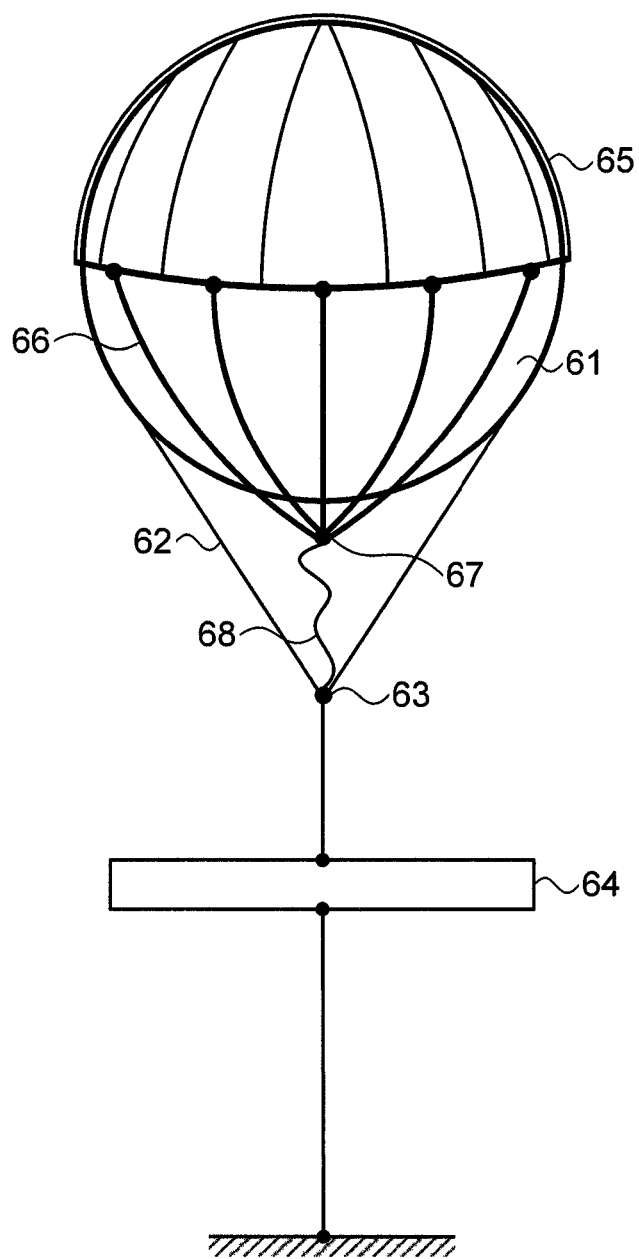
FIG. 6 illustrates schematically a novel parachute based apparatus for ensuring the safety of the payload in the event of a catastrophic failure of the balloon.

Reference is now made to FIG. 6 which illustrates schematically a novel apparatus for ensuring the safety of the payload in the event of a catastrophic failure of the balloon, such as an inflicted puncture or a tear or leak. In prior art balloon-borne systems, in such an event, it is necessary to deploy an on-board parachute in order to bring the payload safely down to the ground, and since deployment of a parachute takes time, in cases where the system is operating close to the ground, there is danger that the payload will be damaged or lost. Additionally the parachute may not deploy as required.

Referring now to FIG. 6, there is shown a balloon 61 with a number of support cords 62 extending from the balloon body, most conveniently from its central region down to a first junction 63 to which the payload platform 64 is attached. Generally three support cords 62 are used to ensure that they all remain under tension. This is the conventional method of attaching a payload platform to its buoyancy balloon. According to the present novel implementation of such balloon borne systems, on the upper section of the balloon, there is draped a canopy 65 having a parachute-like structure, with a plurality of cords 66 extending from its lower edge and tied together at a second junction 67 beneath the balloon. From this second junction an additional cord 68 extends to the first junction 63, this additional cord being of such a length that it is not under tension when the balloon is inflated. The canopy is draped conformally on the balloon, by selection of the correct length of the wrapping cords 66, so that the aerodynamic properties of the balloon are not affected by the presence of the parachute canopy.

In the event that the balloon deflates, the weight of the payload platform is taken up by the wrapping cords 66 and the additional cord 68, which now become tensioned, and the fall of the payload platform is slowed down by the parachute-like canopy, which fills with air as the balloon volume disappears from within it. Because the canopy 65 is draped over the balloon, it is already in place as the balloon deflates, and has the required deployed shape to operate as a parachute, and is thus instantly ready to slow the fall of the payload platform. This is significantly advantageous over prior art systems which require a sensor to detect when the balloon has burst, and a mechanism for deploying the stored parachute. Another advantage is that no payload volume is taken up by a folded parachute, since it is draped over the balloon.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. An aerial balloon system comprising:
    a payload platform comprising an elongated rigid connecting element attached to said payload platform by means of a pivot;
    a lighter-than-air inflated balloon attached to said elongated rigid connecting element from above by means of a balloon cable;
    an anchoring cable attaching said elongated rigid connecting element to an anchor point beneath said payload platform, such that said elongated rigid connecting element is connected in line between said balloon cable and said anchoring cable, and
    a pitch stabilizing system, said pitch stabilizing system comprising:
        an angular actuator operating on said pivot to control the angle said payload platform makes with said elongated rigid connecting element;
        a pitch sensor mounted on said payload platform outputting a pitch signal defining the departure of the pitch of said payload platform from a predetermined pitch; and
        a servo system receiving said pitch signal and configured to output a signal to drive said angular actuator to maintain said payload platform in said predetermined pitch.

2. An aerial balloon system according to claim 1, further comprising an orientation stabilizing system, such that said payload platform has its orientation stabilized even when said payload platform is subject to external forces tending to change its orientation.

3. An aerial balloon system according to claim 2, wherein said orientation stabilizing system comprises:
    an orientation actuator configured to control the orientation of said payload platform;
    an orientation sensor mounted on said payload platform outputting an orientation signal defining the departure of the orientation of said payload platform from a predetermined orientation; and
    a servo system receiving said orientation signal and configured to output a signal to drive said orientation actuator to maintain said payload platform in said predetermined orientation.

4. An aerial balloon system according to claim 3, wherein said orientation actuator comprises at least one rotor rotating in a generally vertical plane, attached in the region of one extremity of said payload platform.

5. An aerial balloon system according to claim 1, wherein said connecting element is a frame having two side elements between which said payload platform is pivotally hung.

6. An aerial balloon system according to claim 5, further comprising a pair of upper attachment cables each attached to one of said side elements of said frame, and wherein said upper attachment cables are joined to each other and to said balloon cable at a single junction.

7. An aerial balloon system according to claim 5, wherein said side elements of said frame are attached to said anchoring cable by a loop attachment cable running round a pulley, and said anchoring cable is connected to the axis of said pulley.

8. A method of stabilizing a payload platform from an aerial balloon, comprising:
   supporting said payload platform from said balloon by means of a balloon cable; and
   attaching said payload platform to an anchor point beneath said payload platform by means of an anchoring cable, said balloon cable and said anchoring cable being attached to said payload platform by means of an elongated rigid connecting element attached by means of a pivot to said payload platform in a region between the attachment points of said balloon cable and said anchoring cable, and
   stabilizing the pitch of said payload platform by a system comprising:
   an angular actuator operating on said pivot to control the angle said payload platform makes with said elongated rigid connecting element;
   a pitch sensor mounted on said payload platform outputting a pitch signal defining the departure of the pitch of said payload platform from a predetermined pitch; and
   a servo system receiving said pitch signal and configured to output a signal to drive said angular actuator to maintain said payload platform in said predetermined pitch.

9. A method according to claim 8, wherein said payload platform has its pitch stabilized even when the angular orientation of at least one of said anchoring and said balloon cables undergoes a change.

10. A method according to claim 8, wherein the orientation of said payload platform is stabilized by an orientation stabilizing system on said payload platform, such that the orientation of said payload is stabilized even when said payload platform is subject to external forces tending to change its orientation.

11. A method according to claim 10, wherein said orientation stabilizing system comprises:
   an orientation actuator configured to control the orientation of said payload platform;
   an orientation sensor mounted on said payload platform outputting an orientation signal defining the departure of the orientation of said payload platform from a predetermined orientation; and
   a servo system receiving said orientation signal and configured to output a signal to drive said orientation actuator to maintain said payload platform in said predetermined orientation.

12. A method according to claim 11, wherein said orientation actuator comprises at least one rotor rotating in a generally vertical plane, attached in the region of one extremity of said payload platform.

13. A method according to claim 8, wherein said connecting element is a frame having two side elements, and wherein said payload platform is pivotally hung between said side elements.

* * * * *